A. E. SCHMIDT.
REVERSING GEARING.
APPLICATION FILED MAY 26, 1910.

985,845.

Patented Mar. 7, 1911.

Witnesses
Chas. F. Bassett
C. B. Benjamin

Inventor
A. E. Schmidt
By Frederick Benjamin
Attorney

UNITED STATES PATENT OFFICE.

ALLEN E. SCHMIDT, OF ELIZABETH, ILLINOIS.

REVERSING-GEARING.

985,845.  Specification of Letters Patent.  Patented Mar. 7, 1911.

Application filed May 26, 1910. Serial No. 563,576.

*To all whom it may concern:*

Be it known that I, ALLEN E. SCHMIDT, citizen of the United States, residing at Elizabeth, in the county of Jo Daviess and State of Illinois, have invented certain new and useful Improvements in Reversing-Gearing, of which the following is a specification.

My invention relates to improvements in gearing of the type in which a driving and a driven shaft are connected by gears which have their relative movements controlled by suitable clutch devices coöperating therewith, whereby the direction of rotation of the driven shaft may be changed without strain upon the various parts which constitute the complete mechanism, and without changing the direction of travel of the driving shaft.

Important objects of the improvements embodied in this application for patent are to provide an efficient, compact and easily lubricated reversible gearing that can be readily adapted for use in connection with motor driven vehicles or boats, and one that can be operated without strain on or damage to the intermeshing pinions, or the drive-shaft or the motor, the latter being driven in a constant direction while the travel direction of the driven shaft may be reversed at the will of the operator.

In the accompanying drawing, and in the following description, I have disclosed one exemplification of my invention without attempting to show the various designs or forms of arrangement to which it may be adapted for commercial purposes, and without indicating in detail operative connections which will necessarily vary in form and arrangement, depending upon the particular location and combination in which my improved gearing may be placed.

Figure 1:
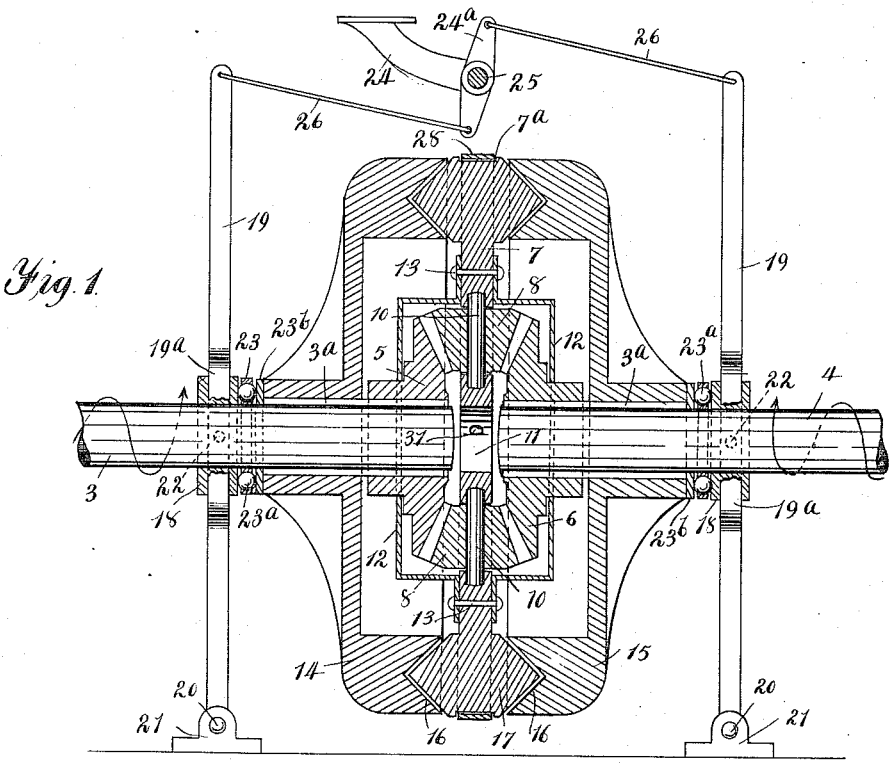
Figure 2:
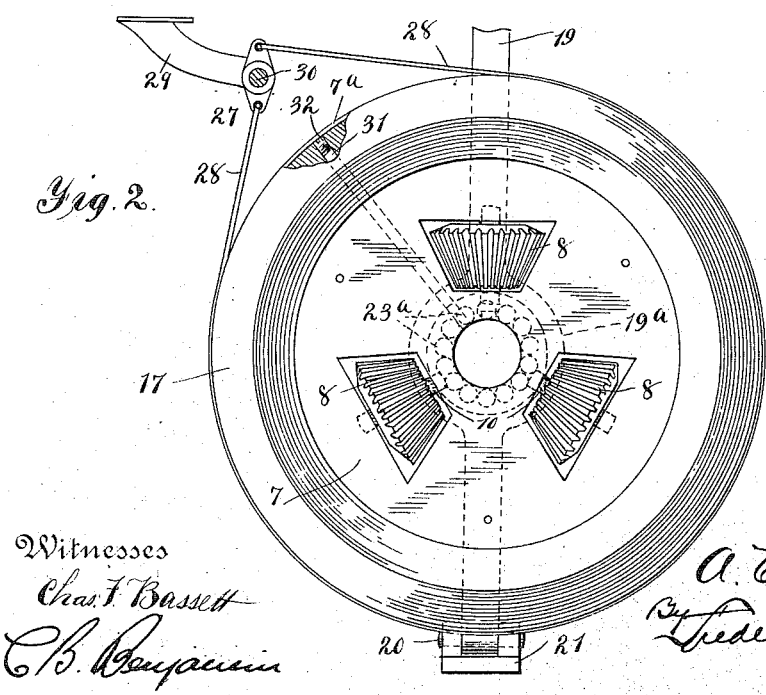

In the accompanying drawing:—Figure 1 is a sectional view showing a gearing embodying the essential features of my invention, and Fig. 2 is a side elevation of the same gearing taken at right angles to Fig. 1, and with one of the members 14 and 12 removed.

Referring to the details of the drawing, 3 represents a driving shaft, which it will be understood, is the engine or motor shaft to transmit power to the driven shaft, represented by the numeral 4. On the end of the shaft 3 is splined a bevel pinion 5, and on the contiguous end of the shaft 4 is similarly splined a corresponding bevel pinion 6. These two pinions are in constant mesh with three bevel pinions 8, which are mounted on spindles 10, radially arranged at equi-distant points and journaled in a friction-disk 7 which is made up of a hub 11 and an integral beveled peripheral rim 17. Secured to opposite sides of the disk 7 by bolts 13, are plates 12, which inclose the nest pinions 5—6 and 8 and form an oil-box or chamber in which they rotate.

Splined on the shafts 3 and 4 respectively, by keys 3ª which permit longitudinal movement, are cylindrical shell members 14, 15, the peripheries of which are annularly grooved as at 16, to fit the rim 17 of the disk 7. Secured to the shafts 3, 4, at points beyond the hubs of the shell members 14, 15, are grooved collars 18 which are engaged by the yokes 19ª of levers 19. These levers are connected at their lower ends by pivots 20, to suitable supports 21, and the collars are provided with oil holes 22.

Between the hubs of the shell plates 14, 15, and the collars 18, anti-frictional means are mounted on the shafts 3 and 4, the same consisting of rings 23 having balls 23ª mounted therein, and washers 23ᵇ, the latter arranged on one side of the rings 23, and the collars 18 on the opposite side, and the balls having a diameter greater than the thickness of the rings in which they are mounted, they contact with the sides of the washers and collars respectively and thus reduce the friction due to the end thrust of the hubs of the plates 14, 15, when they are in operative contact with the disk 7.

A pedal 24 is connected with a double arm lever 24ª mounted on a shaft 25. The arms of this lever are connected respectively with link rods 26, which in turn are coupled with the upper ends of the levers 19. It will be understood that this pedal and its supports and connections will, in practice, be placed where most convenient, and accessible and the arrangement shown in the drawing is merely illustrative of an operative connection regardless of application.

An annular groove 7ª is formed in the periphery of the disk 7, and in same is arranged a flat steel band 28, the ends of which are connected with the outer ends of a two-arm lever 27 which is rockably mounted on a shaft 30, a pedal 29, which is attached to said lever, constituting the rocking means for same.

The operation of a gearing constructed substantially as shown, will be as follows:— By depressing the pedal 24 the levers 19 and the collars 18 which they embrace, will be moved along the shafts 3 and 4 toward the rings 23 which in turn, will be brought into engagement with the washers 23ᵇ at the ends of the hubs of the shell members 15. thus pressing said members toward the disk 7 and causing frictional contact between the flanges of said disk and the grooves of said members. When so arranged, the driving shaft and the driven shaft will turn in a common direction. If it be desired to reverse the driven shaft without altering the direction of the driving shaft, the operator releases the pedal 24 and depresses the pedal 29, whereupon the disk 7 will be held against rotation the shell members will be automatically released from operative contact with the disk, and the intermeshing pinions will cause the driven shaft to turn in a direction opposite to that of the driving shaft.

As the coupling by which the shafts are connected for driving in a common direction is of a frictional type, any undue resistance by the driven shaft would be taken care of by slippage between the shell members and the disk, hence the pinions would be relieved of breaking strains. As the pinions are entirely inclosed by the box 12, they are protected from dust, and by supplying lubricant to the interior of this box through the oil channel 31 and then closing the channel by its screw plug 32, the oil will be effectively and economically utilized.

Having thus described my invention what I claim, is:—

1. In a reversing gearing, the combination with driving and driven shafts, of a disk arranged between the ends of said shafts, intermeshing pinions mounted on said shafts and disk respectively, friction members slidably mounted on said shafts, means for operatively engaging said friction members with said disk, and means for holding said disk against rotation.

2. In reversing gearing, the combination with driving and driven shafts, of a disk arranged between the ends of said shafts, pinions radially mounted on said disk, pinions mounted on said shafts respectively, and in constant mesh with the pinions on said disk, friction members slidably mounted on said shafts, means for moving said friction members into frictional engagement with said disk, means for holding said disk against rotation, and means for inclosing said pinions.

3. In a reversing gearing, the combination with driving and driven shafts, of a disk arranged between said shafts, pinions rotatably mounted on said disk, pinions on the ends of said shaft and in constant mesh with the pinions on said disk, a box inclosing said pinions and forming an oil-chamber therefor, means for introducing oil to said chamber, friction members slidably keyed on said shafts, means for sliding said members into engagement with said disk, and means for holding disk against rotation when free from said members.

In testimony whereof I affix my signature in the presence of two witnesses.

ALLEN E. SCHMIDT.

Witnesses:
DAVID HAIG,
E. L. LEONARD.